United States Patent [19]

Geyer et al.

[11] Patent Number: 4,673,809
[45] Date of Patent: Jun. 16, 1987

[54] OPTOELECTRONIC SCANNING ARRANGEMENT WHEREIN OPTICAL REFLECTIVE MARKINGS FORM CURVILINEAR ARCS

[75] Inventors: Jürgen Geyer, Puchheim; Ernst Kegler, Munich, both of Fed. Rep. of Germany

[73] Assignee: Siemens Aktiengesellschaft, Berlin and Munich, Fed. Rep. of Germany

[21] Appl. No.: 899,184

[22] Filed: Aug. 18, 1986

Related U.S. Application Data

[63] Continuation of Ser. No. 585,489, Mar. 2, 1984, abandoned.

[30] Foreign Application Priority Data

Mar. 22, 1983 [DE] Fed. Rep. of Germany ....... 3310394

[51] Int. Cl.$^4$ ............................................. G01D 5/34
[52] U.S. Cl. ........................... 250/231 SE; 250/237 G
[58] Field of Search ........ 250/231 SE, 237 R, 237 G, 250/566; 324/175; 235/454, 463, 490; 356/237, 395; 340/347 P

[56] References Cited

U.S. PATENT DOCUMENTS 4,409,469 10/1983 Yosuda et al. ...................... 235/463
4,536,650 8/1985 Carena et al. ................ 250/231 SE
4,547,073 10/1985 Kugimiya ............................ 356/237

Primary Examiner—David C. Nelms
Assistant Examiner—William L. Oen
Attorney, Agent, or Firm—Jeffrey P. Morris

[57] ABSTRACT

The invention relates to an optoelectronic scanning arrangement for scanning optical markings. The optical markings consist of a reflecting mark RM and a non-reflecting mark NM which is inclined by an angle W from the axis of the pencil of rays radiated from a light source LS.

4 Claims, 5 Drawing Figures

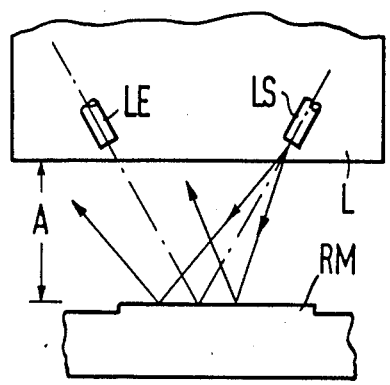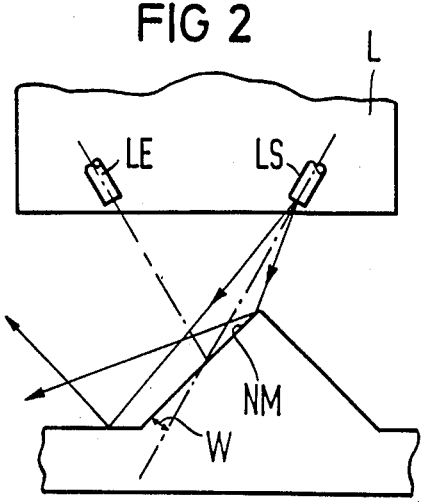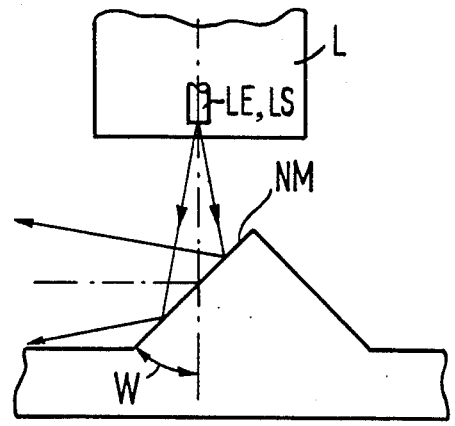

FIG 4
FIG 5
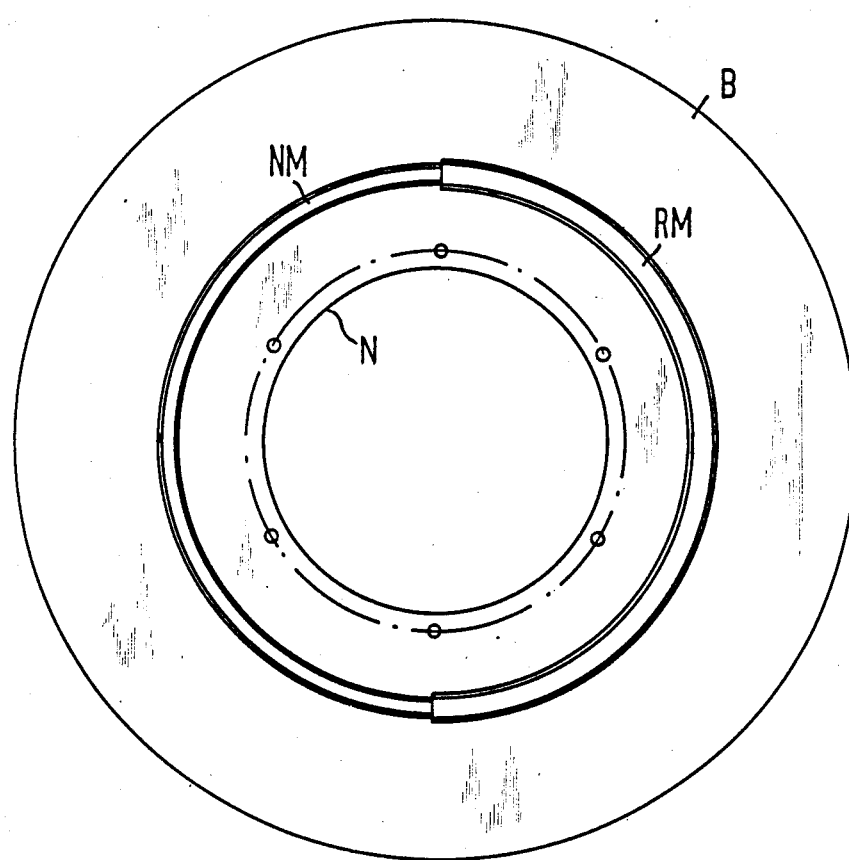
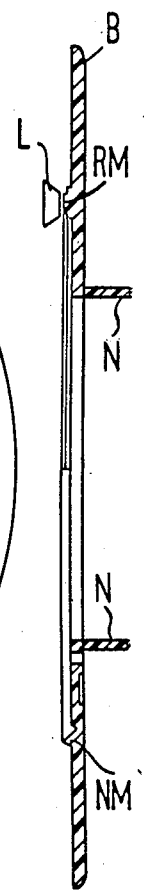

OPTOELECTRONIC SCANNING ARRANGEMENT WHEREIN OPTICAL REFLECTIVE MARKINGS FORM CURVILINEAR ARCS

CROSS-REFERENCE

This is a continuation of Ser. No. 585,489 filed Mar. 2, 1984, now abandoned.

BACKGROUND OF THE INVENTION

The invention relates to an optoelectronic scanning arrangement, in particular, to an arrangement of light sources, light receivers and reflecting marks which result in a more reliable optoelectronic scanning operation.

The use of optoelectronic scanning arrangements for monitoring movement processes is generally known. The present invention is limited to those optoelectronic scanning arrangements where the light emitted by a light source is reflected by a reflection surface and received by a light receiver. Usually the light source and light receiver are accomodated in one housing and form a so-called "reflection light barrier" (photoelectric cell).

To ensure safe and reliable operation of the photoelectric cell, the cell must deliver two clearly distinguishable signals. A first signal to indicate that light reflected by the reflecting surface is being recorded, that is, that a reflecting surface exists, and second signal to indicate that no reflected light is being recorded, that is, that a reflecting surface does not exist.

It is conceivable to use for a reflecting surface a metallized surface, and for a non-reflecting surface a surface of light-absorbing material. It is further known to use as the non-reflecting surface a deep slit, which may furthermore be lined with light-absorbing material. However, diffused light and dirt on the reflecting surfaces reduce the difference between the two signals. Fouling of the reflecting surface results in the reflection of less light toward the light receiver and hence in a smaller signal. Futhermore, stray light may result in more light being received in the light receiver despite the presence of a non-reflecting surface which may create difficulties in distinguishing correct marks. In addition, a soiled non-reflecting surface also produces more light in the light receiver and hence a disturbance of the signal.

SUMMARY OF THE INVENTION

It is the object of the invention to disclose markings for an optoelectronic scanning arrangement, in particular for a photoelectric cell, in the scanning of which the respective output signals are clearly different.

The foregoing object and others are achieved by an optoelectronic scanning arrangement for scanning optical markings which are movable relative to a photoelectric cell having a light source (LS) and a light receiver (LE) which is improved by providing that the markings comprise a reflecting mark (RM) with a surface which reflects a pencil of rays radiated from the light source (LS) onto the light receiver, and a non-reflecting mark (NM) with a surface which is inclined by an angle (W) relative to an axis of the pencil of rays so that the pencil of rays is not reflected into said light receiver (LE) by said non-reflecting mark.

Other features and advantages of the invention will be apparent from the following description of the preferred embodiments, and from the claims.

For a full understanding of the present invention, reference should now be made to the following detailed description of the preferred embodiments of the invention and to the accompanying drawings.

BRIEF DESCRIPTION OF THE DRAWINGS

FIG. 1 shows a photoelectric cell.

FIGS. 2 and 3 show a photoelectric cell with a non-reflecting mark.

FIG. 4 shows, in a plane view, the back of a flanged disk of a fixed tape roll.

FIG. 5 shows, in section, a flanged disk of a fixed tape roll.

DETAILED DESCRIPTION

| Legend: | |
| --- | --- |
| L | Reflection photoelectric barrier |
| LS | Light source |
| LE | Light receiver |
| RM | Reflecting Mark |
| NM | Non-reflecting mark |
| A | Spacing |
| W | Angle |
| N | Hub |
| B | Flanged disk |

In FIGS. 1 to 3 is shown an optoelectronic scanning arrangement consisting of a photoelectric cell L and a reflecting mark RM (FIG. 1) or respectively of a non-reflecting mark NM (FIGS. 2 and 3). The photoelectric cell L consists of a light source LS and a light receiver LE, which are mounted or fitted in a housing. The non-reflecting mark NM is to be understood through the specification and claims to include a surface which does not reflect light emitted by the light source LS into the light receiver LE.

It is assumed that the reflecting mark RM and the non-reflecting mark NM, move relative to the photoelectric cell L. In FIGS. 1 to 3, the direction of movement is chosen to be perpendicular to the drawing plane. In FIGS. 1 and 2 the direct line of optical transmission LS-LE is perpendicular to the direction of movement. IN FIG. 3, since receiver LE and transmitter LS are located at the same point, this point lies in a plane parallel to the direction of movement. Cell L is arranged at a distance A from the reflecting mark RM which is determined by the geometry of the cell, as the light emitted by the light source LS (indicated by arrows in FIGS. 1 to 3) is reflected into the light receiver LE by the reflecting mark RM at the angle of reflection. To increase the degree of reflection, the surface of the reflecting mark RM is, for example, metallized.

The non-reflecting mark NM (FIGS. 2 and 3) is, according to the invention, a surface inclined by an angle W on the axis of the pencil of rays emitted by the light source LS. The angle W is chosen so that despite divergence of the light rays no light coming from the light source LS is reflected from the non-reflecting mark NM into the light receiver LE. This surface, too, may be metallized.

The optoelectronic scanning arrangement according to the invention may be used for example to monitor the rotation of a tape spool, in particular the fixed roll in a magnetic tape recorder. The fixed roll consists of a hub N and two flanged disks, the one facing the recorder being opaque. Such an opaque flanged disk B and partial hub N are shown in a back and in sectional views in FIGS. 4 and 5 respectively. In the radial direction, the reflecting mark RM is arranged about a circle on the right half of the flanged disk B, the non-reflecting mark NM on the left half. Also there is shown in FIG. 5 the scanning photoelectronic cell L. As can be seen from FIG. 5, the surface of the non-reflecting mark NM is inclined toward the hub N, so that the optoelectronic scanning arrangement is insensitive to extraneous light penetrating from the outside. Together with the flanged disk B the non-reflecting mark NM forms in section (FIG. 5) a triangular profile. The height of this profile may be the smaller as the divergence of the light emitted by the light source LS is also smaller. Thus photoelectric cell L can be brought closer to the flanged disk B.

There has thus been shown and described a novel optoelectric scanning arrangement which fulfills all the objects and advantages sought therefor. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

We claim:

1. In an optoelectronic scanning arrangement for scanning optical markings which are movable relative to a photoelectric cell having a light source and a light receiver, the light source and optical receiver being located on the same side of the optical markings, the improvement wherein said markings comprise curvilinear arcs, in particular, a first mark (RM) with a reflective surface which reflects a pencil of rays radiated from said light source (LS) onto said light receiver (LE) and a second mark (NM) with a reflective surface which is inclined by an angle (W) relative to the longitudinal axis of the pencil of rays, so that said pencil of rays is not reflected toward said light receiver (LE) by said second mark.

2. Optoelectronic scanning arrangement according to claim 1, further comprising a tape spool, said first and second marks being located on said tape spool to monitor the rotation of said tape spool of a magnetic tape recorder.

3. Optoelectronic scanning arrangement according to claim 2, wherein said first mark (RM) and said second mark (NM) are applied about a circle on a flanged disk (B) of said tape spool.

4. Optoelectronic scanning arrangement according to claim 3, wherein said second mark (NM) form, in section, together with said flanged disk (B) a triangular profile, said second mark (NM) being inclined toward a hub (N) of said flanged disk (B).

* * * * *